(12) United States Patent
Saitou

(10) Patent No.: US 8,608,390 B2
(45) Date of Patent: Dec. 17, 2013

(54) OPTICAL COMMUNICATION MODULE

(75) Inventor: Takahito Saitou, Shizuoka-ken (JP)

(73) Assignee: Yazaki Corporation, Tokyo (JP)

( * ) Notice: Subject to any disclaimer, the term of this patent is extended or adjusted under 35 U.S.C. 154(b) by 430 days.

(21) Appl. No.: 12/937,001

(22) PCT Filed: Dec. 9, 2008

(86) PCT No.: PCT/JP2008/003662
§ 371 (c)(1),
(2), (4) Date: Oct. 8, 2010

(87) PCT Pub. No.: WO2009/125455
PCT Pub. Date: Oct. 15, 2009

(65) Prior Publication Data
US 2011/0026937 A1 Feb. 3, 2011

(30) Foreign Application Priority Data

Apr. 9, 2008 (JP) ................................ P2008-101809

(51) Int. Cl.
*H04B 10/00* (2013.01)
*G02B 6/42* (2006.01)
(52) U.S. Cl.
USPC .............. 385/92; 398/139; 398/200; 398/214
(58) Field of Classification Search
USPC ............ 398/135–139, 200–201, 214; 385/88, 385/92–94
See application file for complete search history.

(56) References Cited

U.S. PATENT DOCUMENTS 4,410,469 A 10/1983 Katagiri et al.
4,709,979 A 12/1987 Spodati et al.
(Continued)

FOREIGN PATENT DOCUMENTS

CN 101103290 A 1/2008
EP 0 826 997 A2 3/1998
(Continued)

OTHER PUBLICATIONS

Office Action in corresponding Chinese Patent Application No. 200880128521.8 dated Feb. 21, 2012.
(Continued)

*Primary Examiner* — Leslie Pascal
(74) *Attorney, Agent, or Firm* — Finnegan, Henderson, Farabow, Garrett & Dunner, L.L.P.

(57) ABSTRACT

To reduce a size of an optical communication module.<br></br> There is provided an optical communication module 1, which includes a photoelectric conversion element package 10 to which a photoelectric conversion element 12 of either one of a light emitting element and a light receiving element is fitted so as to face one side 11*a* of a resin base 11, and an optical fiber coupler 20 having a light transmission hole 20*c* for coupling with an optical fiber in cylindrical portions 20*a* and 20*b* and mounted on the one side 11*a* of the resin base 11, where the photoelectric conversion element 12 and the light transmission hole 20*c* formed in the optical fiber coupler 20 are assembled aligned with an optical axis K. In the photoelectric conversion element package 10, the photoelectric conversion element 12 is fitted to the other side 11*b* opposite to the one side 11*a* of the resin base 11, and the photoelectric conversion element 12 is arranged at the center of a hole 11*c* bored through between the one side 11*a* and the other side 11*b*, aligned with the optical axis K.

4 Claims, 6 Drawing Sheets

(56) References Cited

U.S. PATENT DOCUMENTS

| | | | |
|---|---|---|---|
| 5,963,693 A * | 10/1999 | Mizue et al. | 385/88 |
| 2003/0202753 A1 | 10/2003 | Kato et al. | |
| 2006/0051031 A1 * | 3/2006 | Walker, Jr. | 385/88 |
| 2008/0123198 A1 | 5/2008 | Fujita | |

FOREIGN PATENT DOCUMENTS

| | | |
|---|---|---|
| JP | 02-275913 | 11/1990 |
| JP | 02-297511 | 12/1990 |
| JP | 05-267694 | 10/1993 |
| JP | 2000-277814 | 10/2000 |
| JP | 2002-023025 | 1/2002 |
| JP | 2002-082258 | 3/2002 |
| JP | 2004-138966 | 5/2004 |
| JP | 2004-334023 | 11/2004 |
| JP | 2006-030813 | 2/2006 |
| JP | 2007-086177 | 4/2007 |
| WO | WO 2006/077775 A1 | 7/2006 |

OTHER PUBLICATIONS

International Search Report for International Application No. PCT/JP2008/003662, mail dated Mar. 23, 2009.

Office Action issued in Japanese Priority Application No. 2008-101809 dated Apr. 16, 2013.

* cited by examiner

OPTICAL COMMUNICATION MODULE

TECHNICAL FIELD

The present invention relates to an optical communication module for optically coupling an optical fiber and a photoelectric conversion element package with each other.

BACKGROUND ART

In optical communication that can transmit optical information obtained by photo-electrically converting large-volume digital information at a high speed by using an optical fiber, an optical communication module is used for optically coupling the optical fiber with a photoelectric conversion element of either one of a light emitting element and a light receiving element fitted in a photoelectric conversion element package.

As this type of optical communication module (optical fiber module), various structural forms have been developed. As a conventional example, there is an optical fiber module including a light emitting device (or a light receiving device) and a housing (for example, see Patent Citation 1).

FIG. 1 is a longitudinal sectional view showing a conventional optical fiber module.

The conventional optical fiber module 100 shown in FIG. 1 is disclosed in Patent Citation 1 mentioned above, and is explained briefly with reference to Patent Citation 1.

As shown in FIG. 1, the conventional optical fiber module 100 includes a light emitting device (or a light receiving device) 110 in which a light emitting element (or a light receiving element) 112 and a light emitting IC (or a light receiving IC) 113 are fitted to one side 111a of a substrate 111, and a housing 120 coupled with an optical fiber (not shown) and mounted on the one side 111a of the substrate 111.

In the light emitting device 110, an LED (Light Emitting Diode) or the like is used as the light emitting element 112. On the other hand, a PD (Photo Diode) or the like is used as the light receiving element 112, and either one of the light emitting element 112 or the light receiving element 112 is fitted to the substrate 111.

In the housing 120, a cylindrical sleeve 120a having a light transmission hole 120a1 formed therein for inserting/deinserting the optical fiber (not shown) and a square body 120b having a stepped depression 120b1 formed therein for housing the light emitting device (or the light receiving device) 110 are connected with each other and integrally formed.

A sealing resin 121 for sealing the light emitting element (or the light receiving element) 112 and the light emitting IC (or the light receiving IC) 113 attached to the substrate 111 is filled in the depression 120b1 in the body 120b of the housing 120, and a transparent epoxy resin or the like is used for the sealing resin 121.

It is described that when the light emitting device (or the light receiving device) 110 is housed in the depression 120b1 in the body 120b of the housing 120, hooks 120b2 formed on side walls opposite to each other in the body 120b are engaged with notches 111b1 formed on upper and lower parts of the other side 111b opposite to the one side 111a of the substrate 111, so that the light emitting element (or the light receiving element) 112 fitted to the substrate 111 has the same optical axis K as that of the light transmission hole 120a1 formed in the sleeve 120a of the housing 120, thereby enabling to reduce the number of man-hours for assembling the optical fiber module 100 and reduce the cost thereof.

Patent Citation 1: Japanese Patent Application Laid-open No. 2006-30813

DISCLOSURE OF INVENTION

Technical Problem

In the conventional optical fiber module 100, because the body 120b is formed in a square shape slightly larger than the light emitting device (or the light receiving device) 110 in order to house the light emitting device (or the light receiving device) 110 in the depression 120b1 in the body 120b of the housing 120, the size of the body 120b increases and a cost of a mold for the square-shaped body 120b increases, thereby to increase a unit price of the optical fiber module 100.

A space is also required for filling the sealing resin 121 for sealing the light emitting element (or the light receiving element) 112 and the light emitting IC (or the light receiving IC) 113 in the depression 120b1 in the body 120b of the housing 120. To ensure this space, it is necessary to set a gap having a predetermined length L1 along the optical axis direction in the depression 120b1 of the body 120b, thereby increasing the total length L of the optical fiber module 100.

Further, the sealing resin 121 becomes expensive because of using a resin material having higher transmittance with respect to the light emitting element (or the light receiving element) 112, and time is required for curing the sealing resin 121. Accordingly, it cannot be said that the assembly performance is good.

Therefore, such an optical communication module with a high performance is desired that can be made small, with the whole length being set short at an inexpensive unit price, without causing optical axis misalignment, when the optical communication module is constructed including the photoelectric conversion element package to which the photoelectric conversion element of either one of the light emitting element and the light receiving element is fitted so as to face one side of a resin base, and an optical fiber coupler mounted on the one side of the resin base for being coupled with an optical fiber.

Technical Solution

The present invention has been made in view of the problems above mentioned, and a first invention provides an optical communication module comprising a photoelectric conversion element package to which a photoelectric conversion element of either one of a light emitting element and a light receiving element is fitted so as to face one side of a resin base, and an optical fiber coupler comprising a light transmission hole for coupling with an optical fiber in a cylindrical portion and mounted on the one side of the resin base, in which the photoelectric conversion element and the light transmission hole formed in the optical fiber coupler are assembled aligned with an optical axis, wherein in the photoelectric conversion element package, the photoelectric conversion element is fitted to the other side opposite to the one side of the resin base, and the photoelectric conversion element is arranged at the center of a hole bored through between the one side and the other side, aligned with the optical axis.

According to a second invention, in the optical communication module according to the first invention, the optical fiber coupler connects a large-diameter cylindrical portion formed long with a large diameter and a small-diameter cylindrical portion formed short with a small diameter, to form the light transmission hole in the both cylindrical portions, and the small-diameter cylindrical portion is fitted into the light transmission hole bored in the resin base.

Further, according to a third invention, in the optical communication module according to the first or second invention, the optical fiber coupler is provided with an imaging lens in the light transmission hole.

Advantageous Effects

The optical communication module of the present invention includes a photoelectric conversion element package to which a photoelectric conversion element of either one of a light emitting element and a light receiving element is fitted so as to face one side of a resin base, and an optical fiber coupler having a light transmission hole for coupling with an optical fiber in a cylindrical portion and mounted on the one side of the resin base, and when the photoelectric conversion element and the light transmission hole formed in the optical fiber coupler are assembled aligned with the optical axis, particularly in the photoelectric conversion element package, the photoelectric conversion element is fitted to the other side opposite to the one side of the resin base, and the photoelectric conversion element is arranged at the center of a hole bored through between the one side and the other side, aligned with the optical axis. As a result, the photoelectric conversion element fitted to the other side of the resin base and the light transmission hole formed in the optical fiber coupler can be assembled aligned with the optical axis with high positioning accuracy, thereby enabling to provide an optical communication module with a high performance, which does not cause optical axis misalignment.

When a small cylindrical portion of the optical fiber coupler is fitted into a positioning round hole formed in the resin base, a space for filling the sealing resin is not required in front of the photoelectric conversion element, which is different from the conventional example. Further, because the profile of the optical fiber coupler is only the cylindrical portion, the optical communication module can be made small, and the whole length thereof can be set short. Because the molds for the optical fiber coupler are not so expensive, the unit price of the optical communication module becomes moderate.

Furthermore, by providing an imaging lens in the light transmission hole formed in the optical fiber coupler, when the light emitting element is applied as the photoelectric conversion element, the light from the light emitting element can be well focused on the optical fiber, and when the light receiving element is applied as the photoelectric conversion element, the light from the optical fiber can be well focused on the light receiving element, thereby enabling to achieve highly reliably optical communication.

EXPLANATION OF REFERENCE

Figure 1:
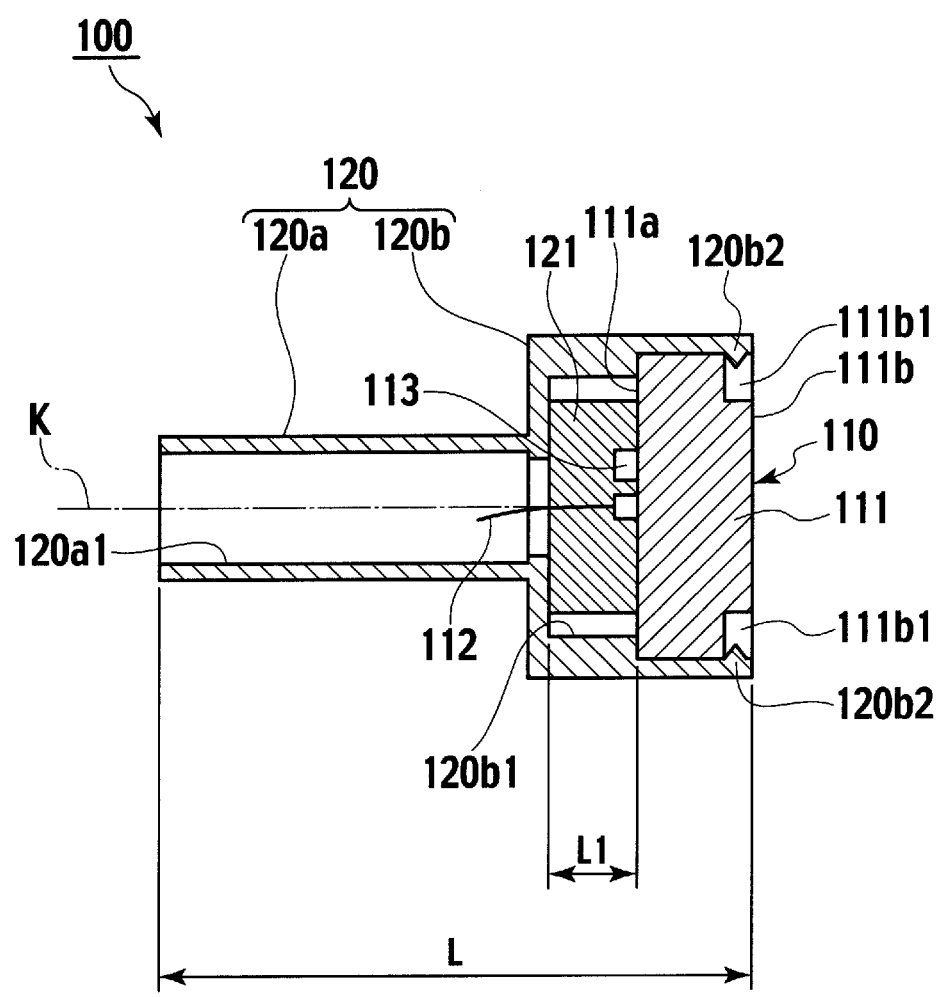
FIG. 1 is a longitudinal sectional view showing a conventional optical fiber module.

1 Optical communication module according to an embodiment
1' Optical communication model in a modified example, in which the optical communication module 1 according to the embodiment is partially modified
10 Photoelectric conversion element package
11 Resin base
11a One side
11b The other side
11c Positioning round hole
11d Bottom
12 Photoelectric conversion element
13 Disk-shaped circuit board
14 Lead frame
14a One side
14b The other side
14c Lead terminal
15 Rectangular circuit board
16 Surface mount device (SMD)
17 IC part (LSI)
18 IC sealing resin
20 Optical fiber coupler
20' Optical fiber coupler in a modified example
20a Large-diameter cylindrical portion
20b Small-diameter cylindrical portion
20c Light transmission hole
20d Imaging lens
K Optical axis

BEST MODE FOR CARRYING OUT THE INVENTION

An optical communication module according to an embodiment of the present invention is explained in detail with reference to FIGS. 2 to 6.

Figure 2:
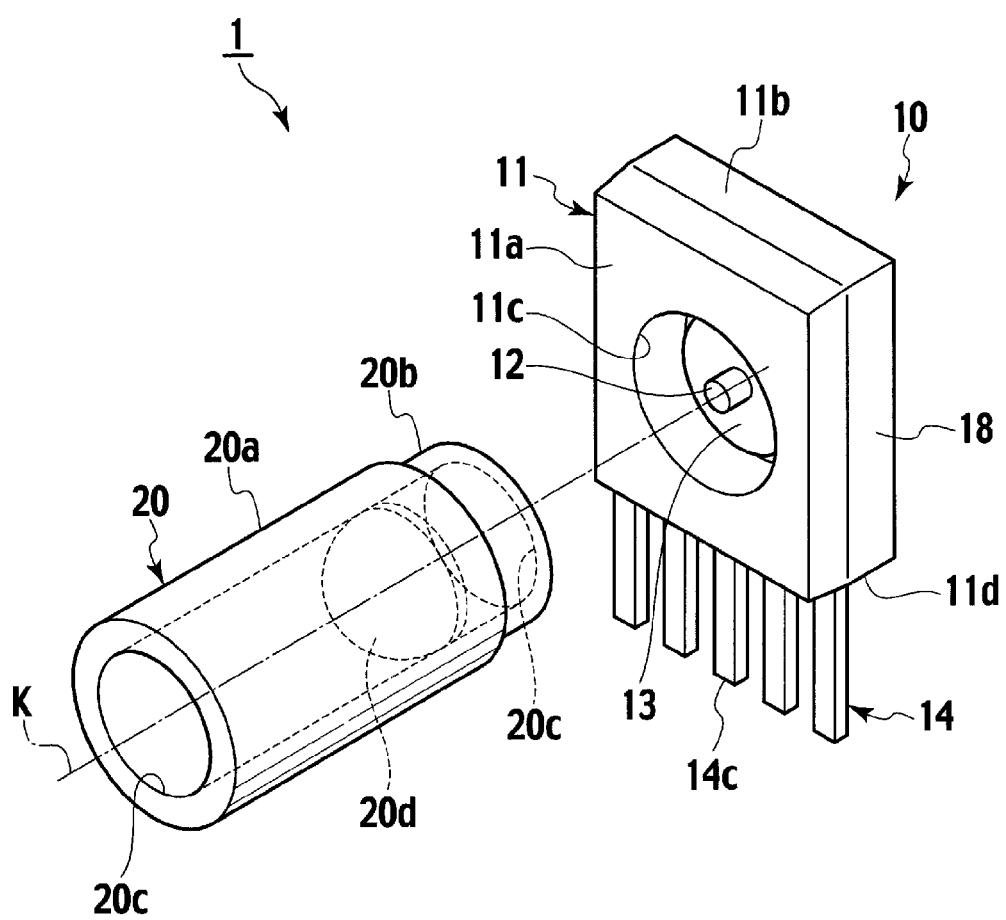
FIG. 2 is an exploded perspective view showing an exploded optical communication module according to an embodiment of the present invention.
Figure 3:
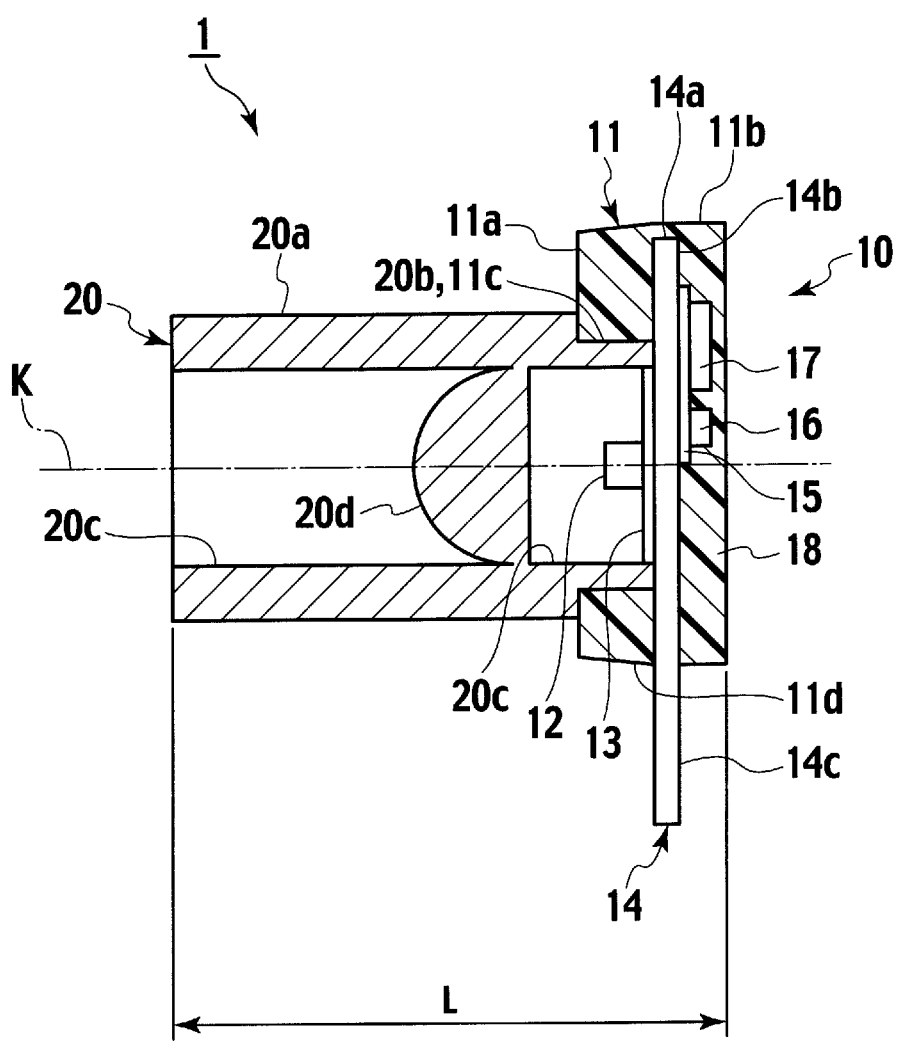
FIG. 3 is a longitudinal sectional view showing the optical communication module according to the embodiment of the present invention.
Figure 4:
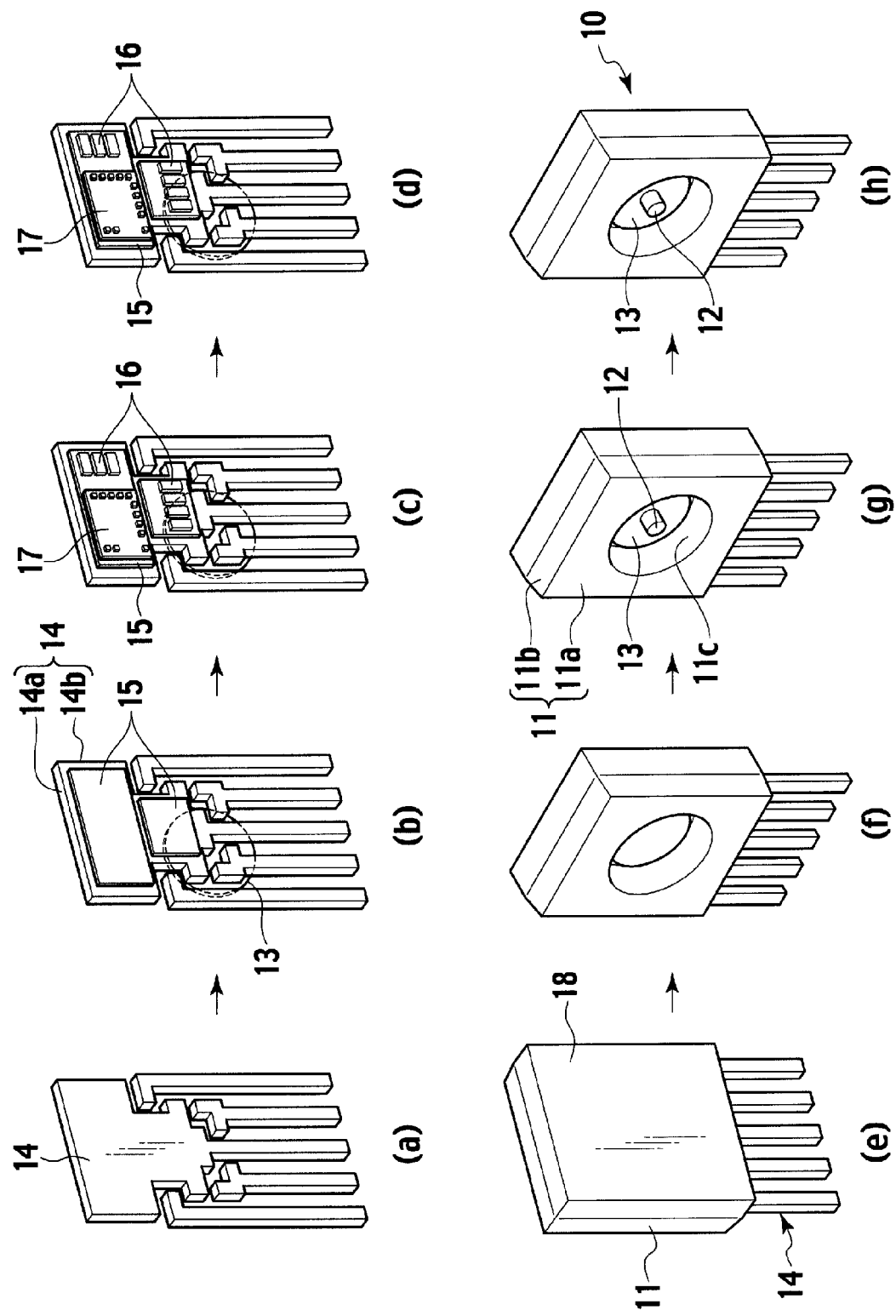
FIGS. 4(a) to 4(h) are process diagrams showing a process for manufacturing a photoelectric conversion element shown in FIGS. 2 and 3.

FIG. 2 is an exploded perspective view showing an exploded optical communication module according to the embodiment of the present invention, FIG. 3 is a longitudinal sectional view showing the optical communication module according to the embodiment of the present invention, and FIGS. 4(a) to 4(h) are process diagrams showing a process for manufacturing a photoelectric conversion element package shown in FIGS. 2 and 3.

As shown in FIGS. 2 and 3, an optical communication module 1 according to the embodiment of the present invention includes a photoelectric conversion element package 10 to which a photoelectric conversion element 12 of either one of a light emitting element and a light receiving element is fitted so as to face one side 11a of a resin base 11 formed substantially in a rectangular solid shape, and an optical fiber coupler 20 including a light transmission hole 20c for coupling with an optical fiber (not shown) in cylindrical portions 20a and 20b and mounted on the one side 11a of the resin base 11, and the photoelectric conversion element 12 and the light transmission hole 20c in the optical fiber coupler 20 are assembled aligned with an optical axis K.

In the optical fiber coupler 20, the photoelectric conversion element 12 is fitted to the other side 11b opposite to the one side 11a of the resin base 11, and the photoelectric conversion element 12 is arranged at the center of a positioning round hole 11c bored through between the one side 11a and the other side 11b, aligned with the optical axis K, thereby enabling to reduce the size of the optical communication module 1.

The respective constituent elements constituting the optical communication module 1 according to the embodiment of the present invention are sequentially explained.

First, in the photoelectric conversion element package 10, which is a relevant part of the optical communication module 1 in this embodiment, the resin base 11 is formed substantially in a rectangular solid shape with a predetermined thickness by using a resin material, and the photoelectric conversion element 12 of either one of the light emitting element and the light receiving element is fitted to the other side 11b opposite to the one side 11a with a gap of a predetermined thickness therebetween.

In this embodiment, because the photoelectric conversion element 12 is soldered at a central position of a disk-shaped circuit board 13 formed in a disk shape, and the disk-shaped circuit board 13 is attached to one side 14a of a lead frame 14 adhered to the other side 11b of the resin base 11, the photoelectric conversion element 12 is fitted to the other side 11b of the resin base 11 via the disk-shaped circuit board 13 and the lead frame 14.

Further, the resin base 11 is bored through between the one side 14a and the other side 14b to form the positioning round hole 11c aligned with the optical axis K, and the disk-shaped circuit board 13, to which the photoelectric conversion element 12 is soldered at the central position of the board, is fitted into the positioning round hole 11c. Therefore, the photoelectric conversion element 12 is arranged at the center of the positioning round hole 11c aligned with the optical axis K.

As described above, either one of the light emitting element and the light receiving element is used for the photoelectric conversion element 12. When the light emitting element is to be applied as the photoelectric conversion element 12, an LED (Light Emitting Diode) or a VCSEL (Vertical Cavity Surface Emitting Laser) is used for the light emitting element. On the other hand, when the light receiving element is to be applied as the photoelectric conversion element 12, a PD (Photo Diode) is used for the light receiving element.

In this embodiment, the VCSEL, which is a kind of the light emitting element, is used as the photoelectric conversion element 12 and soldered at the central position of the disk-shaped circuit board 13.

A conductive plate such as a conductive copper plate is used for the lead frame 14. In the lead frame 14, the one side 14a and the other side 14b opposite to the one side 14a with a gap of a plate thickness are both evenly formed, and the disk-shaped circuit board 13 having the photoelectric conversion element 12 soldered thereto is attached to the one side 14a. On the other hand, as shown in FIG. 3, a rectangular circuit board 15, to which an SMD (Surface Mount Device) 16 and an IC parts (LSI (Large Scale Integration)) 17 are soldered, is attached to the other side 14b, and a plurality of lead terminals 14c extending downward is protruded from a bottom 11d of the resin base 11.

An IC sealing resin 18 such as a thermosetting epoxy resin is filled onto the SMD 16 and the IC parts (LSI) 17 soldered to the rectangular circuit board 15, to cover the both parts 16 and 17.

A manufacturing process of the photoelectric conversion element package 10, which is the relevant part of the present invention, is briefly explained with reference to FIGS. 4(a) to 4(h).

The lead frame 14 is first prepared as shown in FIG. 4(a).

As shown in FIG. 4(b), the disk-shaped circuit board 13 is attached to the one side 14a of the lead frame 14, and two rectangular circuit boards 15 are attached to the other side 14b of the lead frame 14.

As shown in FIG. 4(c), a plurality of SMDs 16 and the IC parts (LSIs) 17 are mounted on the two rectangular circuit boards 15.

As shown in FIG. 4(d), the SMD 16 and the IC parts (LSI) 17 are bonded on the two rectangular circuit boards 15 by an Au wire.

As shown in FIG. 4(e), the resin base 11 is formed on the one side 14a of the lead frame 14 by insert molding, and the SMD 16 and the IC parts (LSI) 17 are covered with the IC sealing resin 18.

As shown in FIG. 4(f), the entire lead frame in a state shown in FIG. 4(e) is reversed.

As shown in FIG. 4(g), a VCSEL, which is a kind of the light emitting element, is mounted on the disk-shaped circuit board 13 fitted into the positioning round hole 11c bored through the resin base 11 between the one side 11a and the other side 11b thereof, as the photoelectric conversion element 12.

As shown in FIG. 4(h), the VCSEL 12 is wire-bonded on the disk-shaped circuit board 13 using the Au wire, to thereby obtain a complete photoelectric conversion element package 10.

The photoelectric conversion element package 10 manufactured in this manner is integrated into a thin and small package, and has satisfactory quality and reliability.

Returning to FIGS. 2 and 3, the optical fiber coupler 20 mounted on the one side 11a of the resin base 11 is injection molded in a stepped cylindrical shape by using light transmitting plastic (for example, PEI, PC, or PMMA), such that a long and large-diameter cylindrical portion 20a and a short and small-diameter cylindrical portion 20b are connected with each other, and the light transmission hole 20c for inserting/deinserting the optical fiber (not shown) is formed starting from the large-diameter cylindrical portion 20a toward the small-diameter cylindrical portion 20b, with an imaging lens 20d being integrally provided in the light transmission hole 20c.

When the light emitting element is applied as the photoelectric conversion element 12, in the imaging lens 20d integrally formed in the optical fiber coupler 20, a side facing the light emitting element is formed in a flat surface, and a side emitting the light from the light emitting element entering into the flat surface is formed in a convex surface.

When the light receiving element is applied as the photoelectric conversion element 12, the imaging lens 20d integrally formed in the optical fiber coupler 20 can be formed in the opposite manner, such that a convex surface (not shown) faces the light receiving element.

Because the imaging lens 20d is provided in the light transmission hole 20c formed in the optical fiber coupler 20, the light from the light emitting element can be focused satisfactorily on the optical fiber (not shown), when the light emitting element is applied as the photoelectric conversion element 12. On the other hand, when the light receiving element is applied as the photoelectric conversion element 12, the light from the optical fiber (not shown) can be focused on the light receiving element satisfactorily. Accordingly, optical communication can be achieved with high reliability.

The large-diameter cylindrical portion 20a formed in the optical fiber coupler 20 is arranged on a side for inserting/deinserting the optical fiber (not shown). On the other hand, the small-diameter cylindrical portion 20b formed in the optical fiber coupler 20 is fitted into the positioning round hole 11c bored through the resin base 11 between the one side 11a and the other side 11b thereof, and fixed with an adhesive (not shown).

Accordingly, the photoelectric conversion element 12 fitted to the other side 11b of the resin base 11, and the light transmission hole 20c and the imaging lens 20d formed in the optical fiber coupler 20 can be assembled with high positioning accuracy, aligned with the optical axis K, and the optical communication module having a satisfactory performance can be provided without causing optical axis misalignment.

When the small-diameter cylindrical portion 20b of the optical fiber coupler 20 is fitted into the positioning round hole 11c formed in the resin base 11, a space for filling the sealing resin is not required in front of the photoelectric conversion element 12, which is different from the conventional example. Further, because the profile of the optical fiber coupler 20 is only the cylindrical portion, the optical communication module 1 can be made small, and the whole length L (FIG. 3) thereof can be set short. Because the molds for the optical fiber coupler 20 are not so expensive, the unit price of the optical communication module 1 becomes moderate.

An optical communication module in a modified example in which the optical communication module according to the embodiment of the present invention is partially modified is briefly explained with reference to FIGS. 5 and 6.

Figure 5:
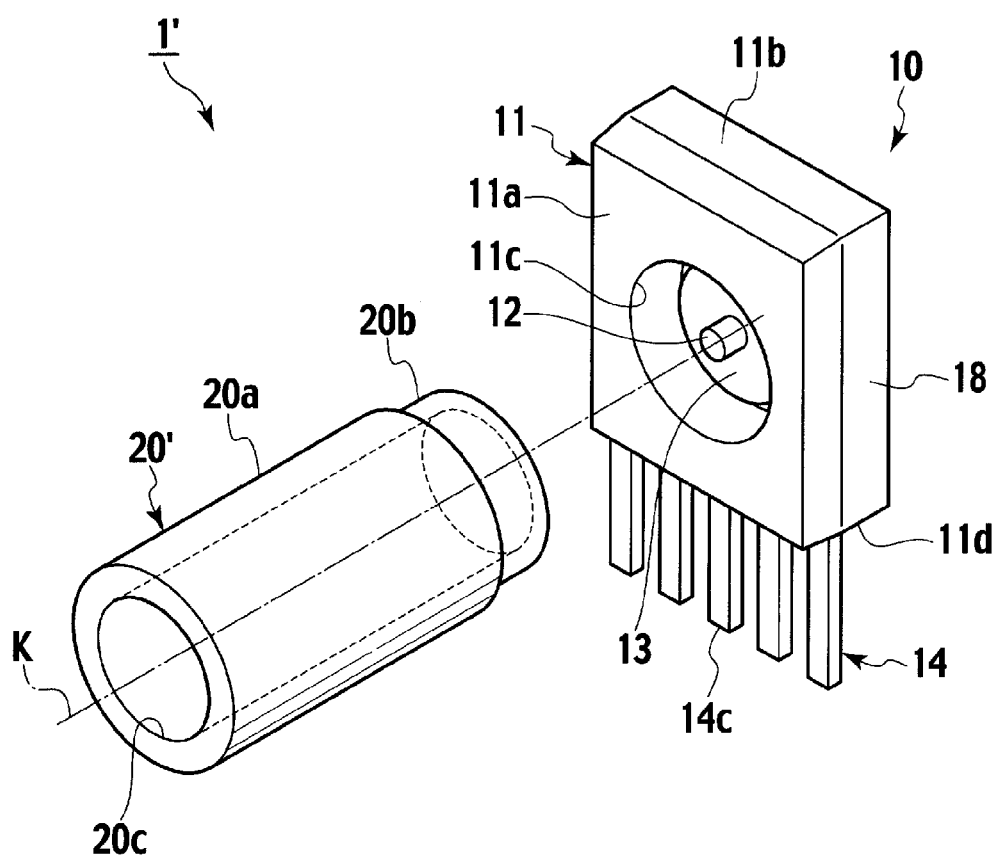
FIG. 5 is an exploded perspective view showing an exploded optical communication module in a modified example, in which the optical communication module according to the embodiment of the present invention is partially modified.

FIG. 5 is an exploded perspective view showing an exploded optical communication module in the modified example in which the optical communication module according to the embodiment of the present invention is partially modified. FIG. 6 is a longitudinal sectional view showing the optical communication module in the modified example in which the optical communication module according to the embodiment of the present invention is partially modified.

In an optical communication module 1' in the modified example shown in FIGS. 5 and 6, only a part of the shape in an optical fiber coupler 20' is different from the con-figuration of the optical communication module 1 according to the first embodiment explained with reference to FIGS. 2 and 3, and like reference numerals refer to like parts or elements and explanations thereof will be omitted for convenience' sake. Points different from the embodiment are mainly explained briefly.

Figure 6:
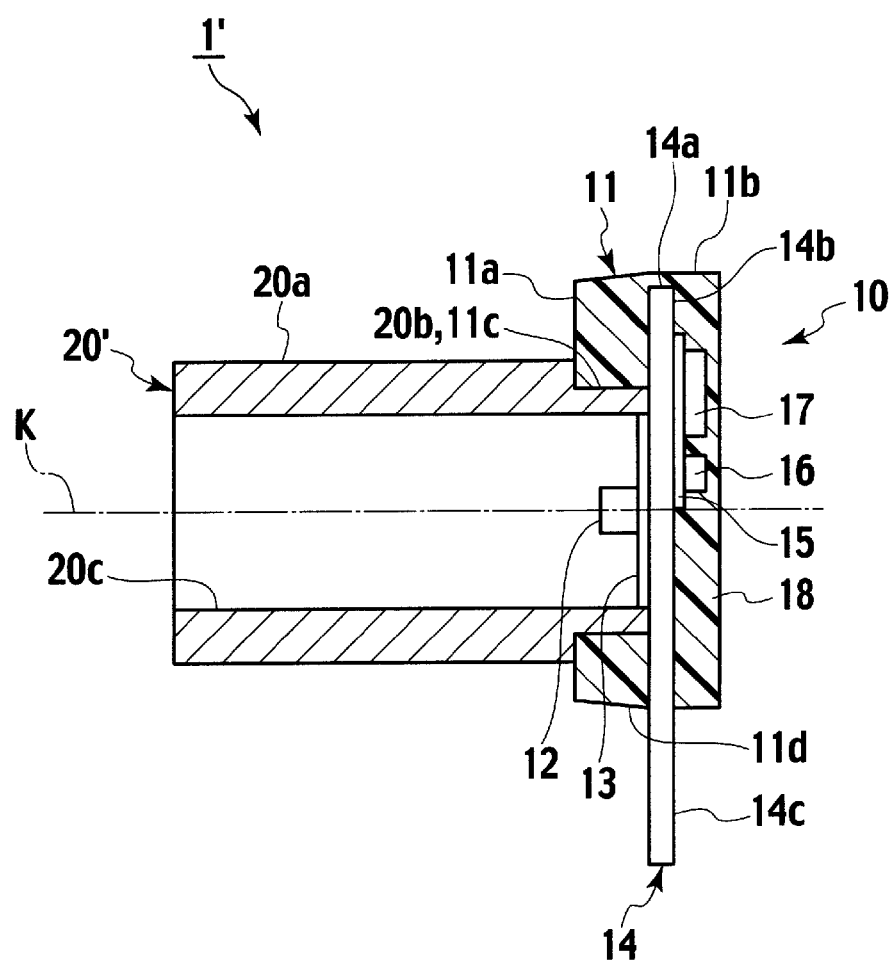
FIG. 6 is a longitudinal sectional view showing the optical communication module in the modified example, in which the optical communication module according to the embodiment of the present invention is partially modified.

As shown in FIGS. 5 and 6, the optical communication module 1' in the modified example in which a part of this embodiment is modified also includes the photoelectric conversion element package 10 to which the photoelectric conversion element 12 of either one of the light emitting element and the light receiving element is fitted so as to face the one side 11a of the resin base 11 formed substantially in a rectangular solid shape, and an optical fiber coupler 20' including the light transmission hole 20c for coupling with the optical fiber (not shown) in the cylindrical portions 20a and 20b and mounted on the one side 11a of the resin base 11, and the photoelectric conversion element 12 and the light transmission hole 20c in the optical fiber coupler 20' are assembled, aligned with the optical axis K, approximately like in this embodiment.

The optical fiber coupler 20' is the same as that according to the embodiment in that the photoelectric conversion element 12 is fitted to the other side 11b opposite to the one side 11a of the resin base 11, and that the photoelectric conversion element 12 is arranged at the center of the positioning round hole 11c bored through between the one side 11a and the other side 11b, aligned with the optical axis K, thereby enabling to reduce the size of the optical communication module 1' in the modified example.

A point different from the first embodiment is that the light transmission hole 20c is bored through between the large-diameter cylindrical portion 20a and the small-diameter cylindrical portion 20b of the cylindrical optical fiber coupler 20', and that no imaging lens is provided in the light transmission hole 20c to simplify the optical fiber coupler 20'.

Accordingly, an existing inexpensive resin material can be used for the optical fiber coupler 20' without using the resin material having high optical transparency as in the embodiment. In the optical fiber coupler 20', further, because no imaging lens is provided, the cost of the molds can be reduced, thereby enabling to provide the optical communication module 1' in the modified example, which can be used more easily with a lower cost than that of the embodiment.

The entire contents of Japanese Patent Application No. 2008-101809 (filed Apr. 9, 2008) are incorporated herein by reference.

Although the invention has been described above by reference to certain embodiments of the invention, the invention is not limited to the embodiments described above. Modifications and variations of the embodiments descried above will occur to those skilled in the art, in light of the above teachings. The scope of the invention is defined with reference to the following claims.

The invention claimed is:

1. An optical communication module, comprising:
    a photoelectric conversion element package to which a photoelectric conversion element of either one of a light emitting element and a light receiving element is fitted so as to face one side of a resin base;
    a positioning round hole formed into the one side of the resin base;
    a disk-shaped circuit board fitted into the positioning round hole; and
    an optical fiber coupler comprising a light transmission hole for coupling with an optical fiber in a cylindrical portion and mounted in the positioning round hole formed on the one side of the resin base,
    wherein the photoelectric conversion element and the light transmission hole formed in the optical fiber coupler are assembled aligned with an optical axis; and
    the photoelectric conversion element is arranged at the center of the disk-shaped circuit board and fitted at the center of the positioning round hole, aligned with the optical axis, wherein the side of the photoelectric conversion element that faces toward the one side of the resin base is free from contact with sealing resin.

2. The optical communication module according to claim 1, wherein the optical fiber coupler connects a large-diameter cylindrical portion formed long with a large diameter and a small-diameter cylindrical portion formed short with a small diameter, to form the light transmission hole in the both cylindrical portions; and the small-diameter cylindrical portion is fitted into the light transmission hole bored in the resin base.

3. The optical communication module according to claim 2, wherein the optical fiber coupler is provided with an imaging lens in the light transmission hole.

4. The optical communication module according to claim 1, wherein the optical fiber coupler is provided with an imaging lens in the light transmission hole.

* * * * *